US006904670B2

(12) United States Patent
Kawamura et al.

(10) Patent No.: US 6,904,670 B2
(45) Date of Patent: Jun. 14, 2005

(54) FRAME JIG FOR A CONNECTOR

(75) Inventors: Hiroshi Kawamura, Yokkaichi (JP); Katsunari Tafuku, Yokkaichi (JP); Kazutaka Nakao, Yokkaichi (JP)

(73) Assignee: Sumitomo Wiring System, Ltd., Yokkaichi (JP)

( * ) Notice: Subject to any disclaimer, the term of this patent is extended or adjusted under 35 U.S.C. 154(b) by 621 days.

(21) Appl. No.: 09/861,707

(22) Filed: May 22, 2001

(65) Prior Publication Data

US 2001/0047584 A1 Dec. 6, 2001

(30) Foreign Application Priority Data

Jun. 1, 2000 (JP) ....................................... 2000-164009
Feb. 16, 2001 (JP) ....................................... 2001-040136

(51) Int. Cl.[7] .......................... B23P 19/00; H01R 43/00

(52) U.S. Cl. ............................. 29/748; 29/749; 29/754; 29/755; 29/33 M; 29/33 F; 140/118; 140/149; 269/45; 269/903

(58) Field of Search .......................... 269/299, 45, 287, 269/40, 903; 140/118, 149; 29/566.4, 751, 753, 748, 749, 747, 754, 755, 760, 866, 720, 721, 33 M, 832, 842

(56) References Cited

U.S. PATENT DOCUMENTS 3,680,193 A * 8/1972 Scaminaci et al. ............ 29/271
5,125,150 A * 6/1992 Meyer ........................ 29/566.3
5,142,764 A * 9/1992 Whiteside ..................... 29/559
5,884,393 A * 3/1999 Miyazawa ................... 29/739
2001/0047584 A1 * 12/2001 Kawamura et al. ........... 29/748

FOREIGN PATENT DOCUMENTS

JP 7-230845 8/1995
JP 8-255654 10/1996
JP 09063735 * 3/1997

OTHER PUBLICATIONS

English Language Abstract of JP 7–230845.
English Language Abstract of JP 8–255654.

* cited by examiner

*Primary Examiner*—Minh Trinh
(74) *Attorney, Agent, or Firm*—Greenblum & Bernstein, P.L.C.

(57) ABSTRACT

A frame jig for a connector is provided in order to be able to easily confirm the kinds of electric wires to be inserted in a connector and the installation locations. The frame jig for a connector includes a holder having a recess and apertures adjacent every location that confronts a respective cavity of the connector retained in the recess. Additionally, at the peripheral rim of the recess at the upper face of the holder, side recesses are provided on the side faces of the holder. First ends of sample electric wires are inserted in the apertures which confront the installation cavities of the corresponding kinds of electric wires to be installed in the connector. The other end of the sample wires inserted into recesses formed in sides of the holder, and locking members are inserted into the side recesses.

14 Claims, 10 Drawing Sheets

FRAME JIG FOR A CONNECTOR

BACKGROUND OF THE INVENTION

1. Field of the Invention

The present invention relates to a frame jig for a connector, and particularly to a jig that enables confirmation of the kinds of electric wires to be inserted into a number of cavities of the connector during the assembly of a wire harness.

2. Description of Background Information

A wire harness used for connection of various electrical equipment mounted on an automobile and the like is constructed by bundling many electric wires, and a connector for connection is installed at the terminal end of the wires. The installation of the connector is carried out in the assembly of the wire harness on an assembly diagram board on which a large number of various jigs and the like for wiring electric wires are provided.

FIG. 10 shows a conventional condition of installing the terminals of electric wires on a connector C, and the electric wires D are installed in turn in the connector C retained in recess of the holder 1*a* of the frame jig 1 which is provided to protrude from the assembly diagram board Z. Since the connection partner for each of the electric wires D constituting the wire harness is prescribed for each electric wire, the coatings of the electric wires D are colored and marks and the like are added in order to discriminate between the electric wires D.

The coatings of ends of the electric wires D are removed, the core wires Da are exposed, male or female terminals T are installed, and the electric wires D are installed in the connector C by inserting the terminals T into a respective one of the cavities Ca which are provided in the rear of the connector C and hooked therein.

Since the connection partner for each of the electric wires is also prescribed for the installation into the cavities Ca, the objective cavities Ca into which the terminals T of the electric wires D are to be inserted are also designated, and the designation is usually described in an arrangement drawing of a work instruction during the installation of a connector. A worker installs the designated electric wires D in the cavities Ca at the designated points in accordance with the designation content of the arrangement drawing.

Further, the installation of the electric wires D is usually carried out in both a pre-step called a “first-in” and a post-step called “last-out” in the assembly steps of the wire harness. A group of electric wires are installed in several of the cavities in the first-in step, then another group of electric wires are installed in the remaining cavities in the last-out step, and all groups of electric wires constituting the wire harness are installed in the connector.

The installation of the electric wires is carried out based on the arrangement drawing as described above, but there is a problem that an installation error of the electric wires caused by a mistake in the arrangement drawing and the like occurs. Namely, a worker must select the required electric wire from many electric wires by confirming the arrangement drawing, and further, the selected electric wires that are to be inserted into the cavities at the required position selected from many cavities must be made by again confirming the arrangement drawing. A mistake in the arrangement drawing, or of reading the arrangement drawing, and the like are easy to occur, and the burden required for confirmation by the worker is great.

Further, since the worker repeats the above-mentioned working order and assembles the wire harness in mass production, a mistake in reading the arrangement drawing and the like are apt to increase in accordance with the fatigue of the worker. Further, when a new arrangement drawing is introduced, or when a new worker engages in the assembly, and the like, there is a likelihood that a mistake in selection of installation points will occur. Further, it is required that the electric wires inserted by mistake as described above be inserted in the proper cavities. This requires removing the terminals from the cavities. There is the danger that the removal of the terminals may cause deformation of the terminals and damage to the connector. Further, it takes time and trouble to confirm the arrangement drawing as described, and thus there is the problem that working efficiency is also reduced.

SUMMARY OF THE INVENTION

The present invention was achieved in consideration of the above-mentioned problems, and an object is to make it easy to confirm the required electric wires to be installed and the required cavity positions of the connector, to reduce mistakes in the insertion of the electric wires, and to make the installation of the electric wires more efficient.

In order to solve the above-mentioned problems, the present invention provides a frame jig for a connector that is mounted to the upper surface of the assembly diagram board or wiring board for assembling a wire harness. The frame jig retains a connector, installed with terminals of electric wires wired on the assembly diagram board, by a recess provided on the upper face of a holder. The holder has a construction such that the same kinds of sample electric wires as the electric wires inserted in respective cavities of the connector are installed at locations which confront the respective cavities of the connector which are retained by a peripheral rim of the recess.

Thus, when the same kinds of electric wires as the wires to be installed on the connector are installed on the holder of the frame jig as the sample electric wires, the electric wires to be installed can be determined at a glance by observing the sample electric wires. Therefore, the requisite electric wires can be selected from a large number of electric wires without confirming by the arrangement drawing or wiring diagram. Further, since the sample electric wires are installed at the peripheral rim at the locations which confront the respective cavities of the connector retained by the recess of the holder, the insertion locations of cavities can be discriminated without confirming the arrangement drawing.

Accordingly, the insertion work of a connector is carried out by selecting the kinds of electric wires that coincide with the kinds and installation locations of the sample electric wires installed on the holder, and then insert the electric wires into the cavities at the corresponding locations. Accordingly, confirmation of the arrangement drawing becomes unnecessary and the efficiency of the installation work can be improved. Further, since the kinds and installation locations of the sample electric wires are also clear as compared with a conventional description in the arrangement drawing, the occurrence of mistakes in inserting electric wires can be reduced. Further, the same kinds of the sample electric wires as the electric wires to be installed in the connector are installed on the holder, therefore the degree of mastery by a worker for start-up production of a new machine is speeded up, and guidance and the like of a new worker is easily carried out.

According to one aspect of the present invention, apertures are provided in the peripheral rim of the holder at every location that confronts a respective cavity of the connector. Recesses are provided on the side faces of the holder at the sides where the apertures are provided, and one end of the sample electric wires is inserted into the apertures and the other ends of the sample electric wires are inserted into recesses in side surfaces of the holder. Locking members, formed as separate bodies, are positioned in the side recesses, and the sample electric wires are installed in a condition for easy installation and removal.

Thus, when the apertures are provided in the upper surface of holder and the side recesses are provided in the side faces, replacement of the sample electric wires can be easily carried out. Accordingly, when the connector to be installed with electric wires is changed, or even when the cavities in which the electric wires are to be installed are changed, the changes can be easily accomplished by removing the sample electric wires and installing the requisite kinds of sample electric wires into the corresponding apertures and side recesses.

Further, the frame jig for a connector of the present invention can be suitably used in either of the first-in step and the last-in step. Namely, when only the sample electric wires corresponding to the first-in electric wires are installed in the corresponding locations in the first-in step, the first-in installation work can be easily carried out based on the sample electric wires. Similarly, when only the sample electric wires corresponding to the last-in electric wires are installed in the corresponding locations in the last-in step, the last-in installation work can be easily carried out based on the sample electric wires. Further, the locking members are formed as a separate body, and may be formed of any suitable material, such as a resin, a rubber and the like, so as to have the same cross-sectional area as the size of the side recesses of the holder. Thus, when the locking members are fitted into the side recesses, the contacting areas of the sample electric wires are bent and the ends of the sample electric wires are retained.

In another aspect of the present invention, the sample electric wires may be fixed by providing electric wire grooves in the peripheral rim in parallel at every location that confronts the respective cavities of the connector, by fitting the sample electric wires in the electric wire grooves, and by mounting and fixing a transparent panel on the peripheral rim on which the electric wire grooves are provided. Thus, the sample electric wires can also be fixed by the electric wire grooves and the transparent panel. Namely, since the electric wire grooves are provided at locations which confront with the respective cavity positions of the connector retained in the recess, the kinds and positions of the respective electric wires can be easily confirmed through the transparent panel by fixing the sample electric wires when the transparent panel is mounted after fitting the same kinds of sample electric wires as the electric wires to be inserted in the cavities at positions confronted by the respective electric wire grooves.

In a further aspect of the present invention, the side recesses are provided at a distance from the upper end of the holder side faces, parallel grooves that extend upwardly and downwardly are provided to communicate with the side recesses at every location which confronts the apertures from the upper end of the holder side faces to the side recesses, and the sample electric wires are arranged in parallel while lying in the grooves. As described above, when the grooves are provided to extend from the upper end of the holder side faces to the side recesses, the respective sample electric wires are installed in parallel by fitting into the grooves the sample electric wires having ends that are inserted in the apertures. Accordingly, the positions of cavities corresponding to the sample electric wires are further made clear, and the confirmation can be easily carried out. Additionally, since the sample electric wires can be also confirmed from the holder side, improvement of the confirmation property can be also designed for various working positions.

According to another aspect of the present invention, moving members are installed on the holder so as to be able to approach and withdraw from the peripheral rim on which the sample electric wires are provided. The upper openings of the respective cavities not required to have the electric wires inserted are blocked in the approaching position of the moving members. Masking bars having a length that allows covering and uncovering of the upper opening of the recess protrude from the moving members.

As described above, when the moving members from which the masking bars protrude are installed on the holder, the cavities where electric wires of the connector are not required to be inserted are blocked by the masking bars when the moving members approach to the holder at insertion of the electric wires. Therefore, the insertion of the electric wires into the blocked cavities becomes physically impossible, and the insertion errors of the electric wires can be positively prevented. Further, since the masking bars are positioned at the locations corresponded to the cavities which are not required to have wires inserted, the sample electric wires which were installed on the peripheral rim of the holder are not interrupted, and a problem in confirmation of the kinds of electric wires to be inserted does not occur. Further, when the moving members move away from the recess of the holder, the masking bars retreat from the recess of the holder, and the opening of the recess is uncovered. Therefore, the installation and removal of the connector in the recess can be reasonably carried out. Further, the locations of the protruding masking bars can be appropriately changed in accordance with the connector in which the wires are to be installed.

DETAILED DESCRIPTION OF THE PREFERRED EMBODIMENT OF THE PRESENT INVENTION

The mode of operation of the present invention is illustrated referring to drawings below.

Figure 1:
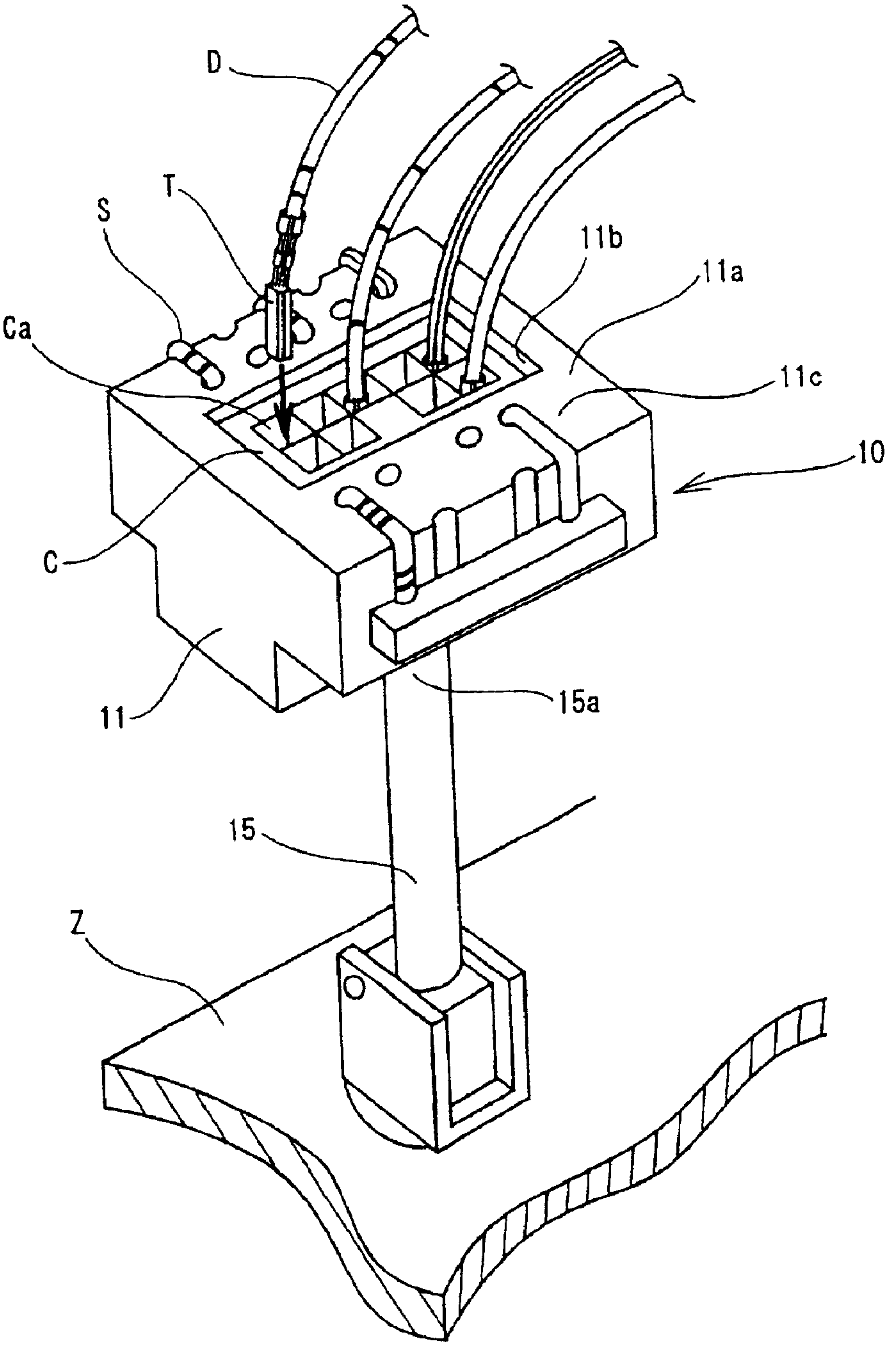
FIG. 1 is a perspective view of the frame jig for a connector according to the present invention.

FIG. 1 shows a frame jig 10 for a connector C in accordance with a first embodiment of the present invention. A holder 11 is provided on the upper end 15*a* of a supporting column 15 which is provided to extend upwardly from the assembly diagram board Z. The holder 11 also includes various sample electric wires S that are the same as the electric wires D to be inserted in the connector C.

Figure 2:
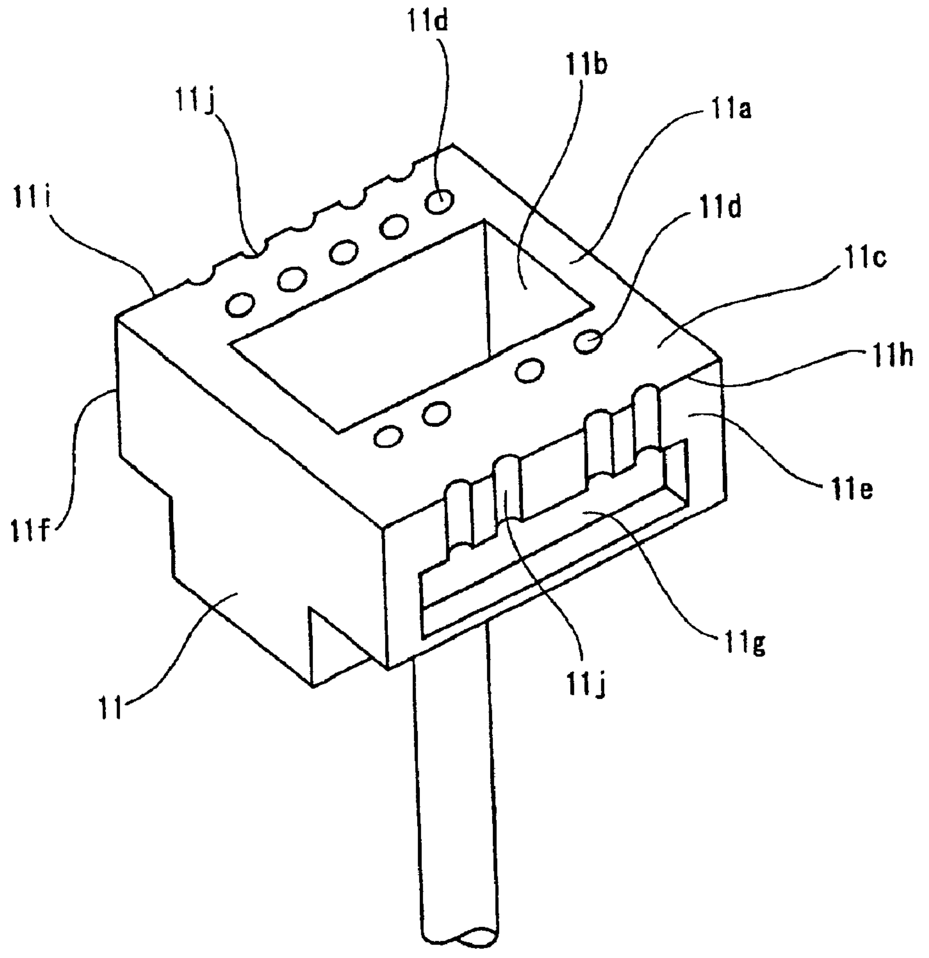
FIG. 2 is a perspective view of the holder of the frame jig for a connector.

As shown in FIG. 2, the holder 11 includes a recess 11*b*, for retaining a block-shaped connector, at the upper face 11*a* of the holder 11. Further, a number of apertures 11*d* in which first ends of the sample electric wires S are inserted are provided at the periphery 11*c* of the recess 11*b*. In the present embodiment, the connector C which is to be assembled is a connector having two sets of cavities Ca, and each of the apertures 11*d* is provided along the side of the recess 11*b* at every point adjacent to the respective cavities Ca in a condition in which the connector C is retained in the recess. Further, the diameter of the apertures adjacent the recess 11*b* is established considering the electric wire diameter of the sample electric wires S, so that the electric wires S to be inserted are not easily removed.

Further, side recesses 11*g* are provided on the side faces 11*e*, 11*f* (only one side recess being shown in FIG. 3) which are situated in a direction at which the apertures 11*d* are provided, respectively. The side recesses 11*g* are spaced from the upper ends 11*h*, 11*i* of the side faces 11*e*, 11*f*, and have long rectangular openings having a slightly narrower length dimension than the length of the holder 11. Further, parallel grooves 11*j* are formed between the upper ends 11*h*, 11*i* of the side faces 11*e*, 11*f* and the side recesses 11*g*. These grooves 11*j* have the same width as the electric wire diameter of the sample electric wires S so as to be able to receive the sample electric wires S, and the intervals between the respective grooves 11*j* are equal and correspond to the intervals between the respective apertures 11*d* in the upper face 11*a*.

Figure 3:
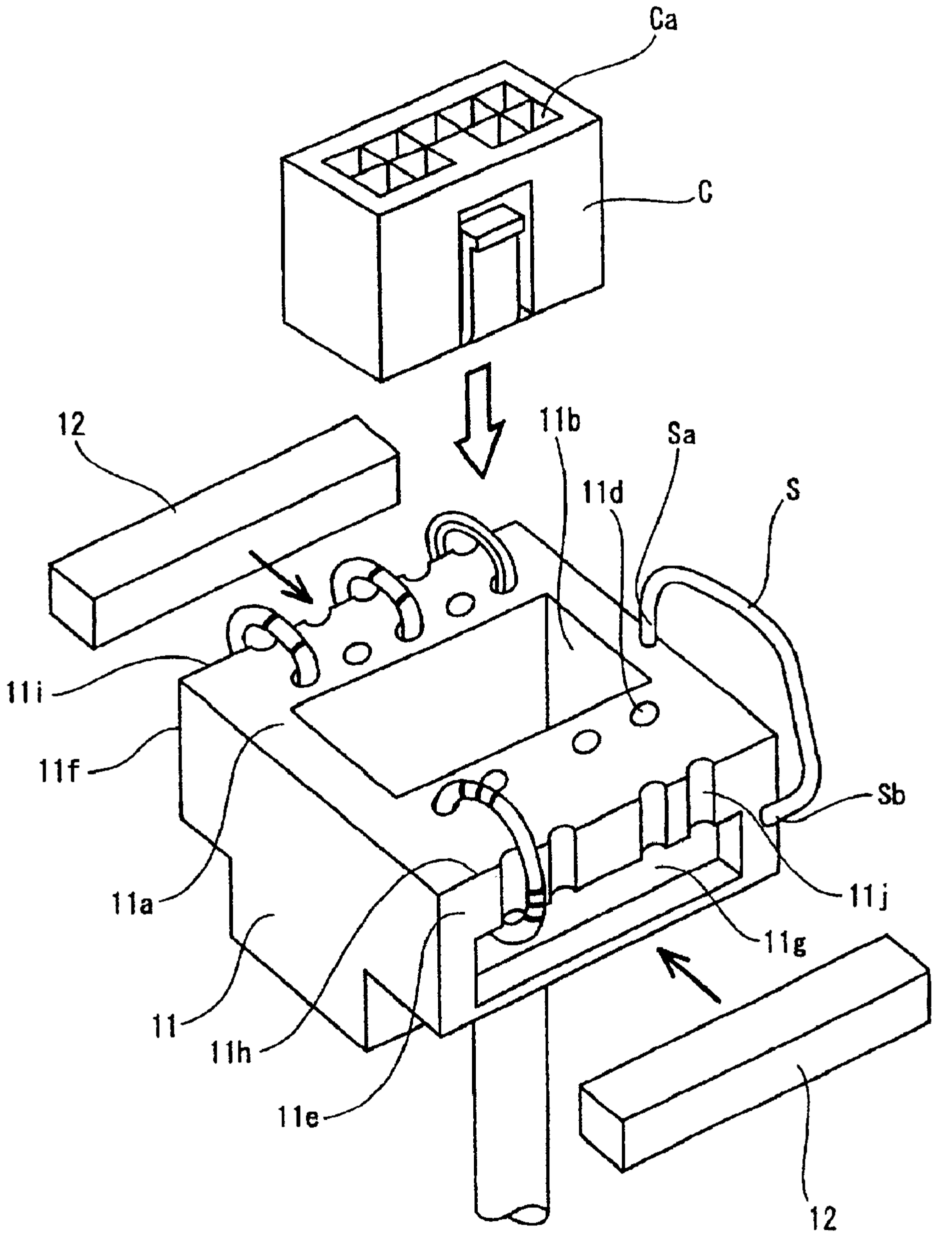
FIG. 3 is a perspective view showing the installation of electric wires on the holder.

Further, as shown in FIG. 3, the holder 11 receives locking members 12 inserted into the side recesses 11*g*. The locking members 12 are formed as separate bodies, and are formed of any suitable material such as a resin, a rubber and the like, having elasticity, flexibility and the like. The locking members 12 are preferably formed in a generally square bar shape having a slightly larger cross-section than the openings of the side recesses 11*g*. However, the locking members 12 may have any suitable shape. The locking members 12 are designed to be positively installed while being deformed and retained by pressing into the side recesses 11*g*, due to the use of a material having the above-mentioned properties. When the sample electric wires S are present, the sample electric wires S are designed to be able to be retained and locked by bending.

The frame jig 10 for a connector is further described below, exemplifying a case applied to the first-in step of the electric wires.

As shown in FIG. 3, firstly, the same kinds of sample electric wires S as the electric wires to be inserted at the first-in step are prepared, and these sample electric wires S are installed on the holder 11.

As the sample electric wires S, wires are prepared having lengths sufficient to reach from the apertures 11*d* of the holder 11 to the side recesses 11*g*, and the same kinds of sample electric wires S are installed into the apertures 11*d* at positions which correspond to the cavities Ca of installed positions of the connector. During installation, one end Sa of each sample electric wire S is inserted into the respective aperture 11*d* and the side faces 11*e* (11*f*). The sample electric wires S are then bent downwardly at the upper ends 11*h* (11*i*) and conducted along the side faces 11*e* (11*f*) to be positioned in the grooves 11*j*, and the other ends Sb are bent to position the ends within the side recesses 11*g*. Similarly, other sample electric wires S corresponding to the apertures 11*d* are installed in turn thereafter.

Then, the locking members 12, which are formed as separate bodies made, for example, of a resin, a rubber or the like, are pressed into the side recesses 11*g*, and the locking members 12 are appropriately deformed to retain the other ends of the sample electric wires S. Each of the sample electric wires S thus installed is arranged in parallel, and can be easily confirmed from both the upper face 11*a* and the side faces 11*e*, 11*f*.

The connector C is retained in the recess 11*b* of the frame jig 10 for a connector which is prepared as described above, the same kinds of electric wires D as the sample electric wires S are selected from a group of the first-in electric wires which form the wire harness as shown in FIG. 1. The terminals T of the ends of the electric wires D are inserted in the cavities Ca confronting the installation points of corresponding sample electric wires S. Thereafter, similarly, the kinds of electric wires and the positions of cavities are confirmed by the sample electric wires S and installed in turn, and the installation work is carried out without confirmation of the arrangement drawing.

Further, when the connector and the positions of cavities where electric wires are to be inserted are changed, the locking members 12 are removed and exchanges of the appropriate kinds of sample electric wires S and the installation positions are performed. Additionally, in the last-in step, the same kinds of the electric wires as the last-in electric wires are installed in the apertures corresponding to the installation points, and the corresponding kinds of electric wires are then selected, without confirming the arrangement drawing as described above, and are inserted into the corresponding cavities.

Further, the frame jig for a connector of the present invention is not limited to the above mode of operation, and for example, when a connector to be installed is a type having one set of cavities, it is sufficient to install the sample electric wires in any one side of the recess of a holder. Further, when the shape of the holder and the like are limited, it is not always necessary to provide a groove on a side face.

Figure 4:
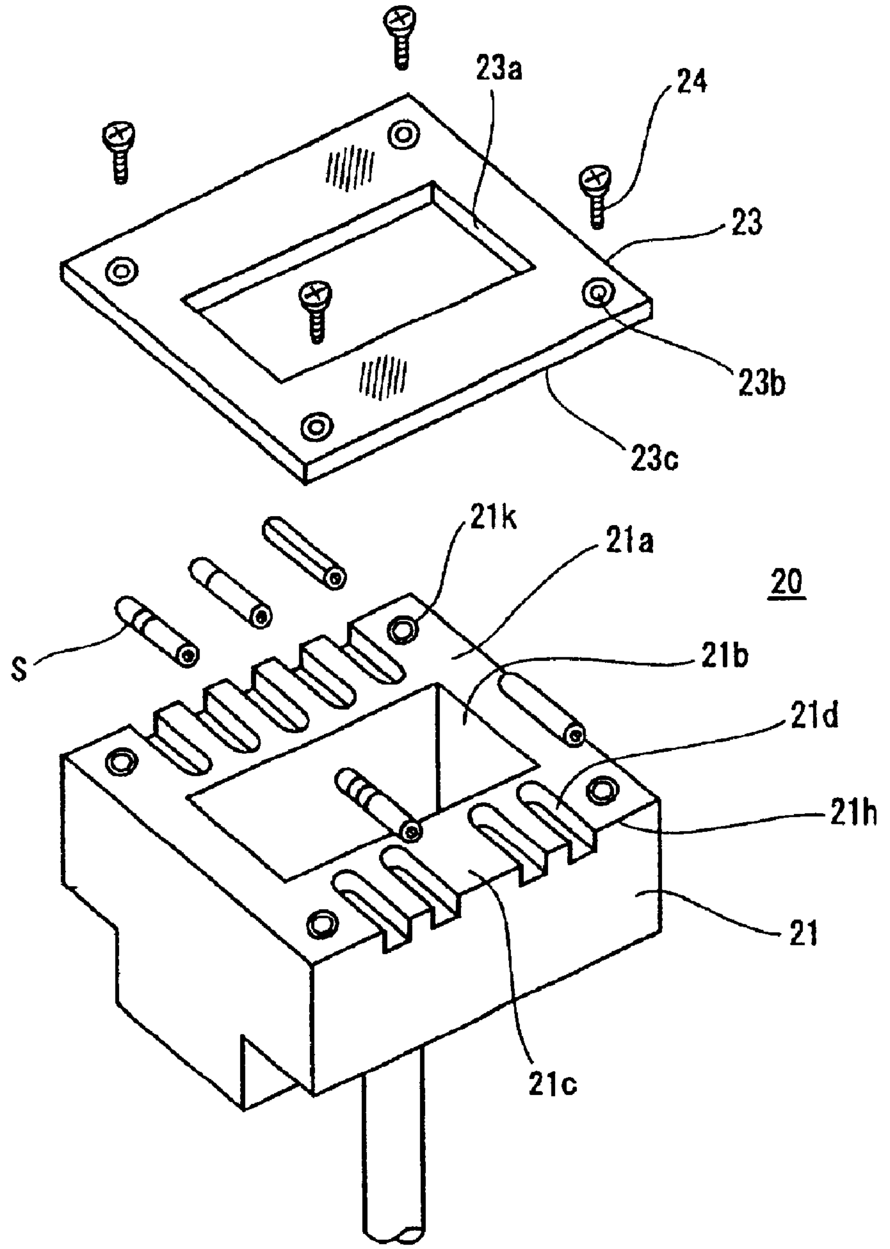
FIG. 4 is an exploded perspective view of the frame jig for a connector according to a second embodiment of the present invention.
Figure 5:
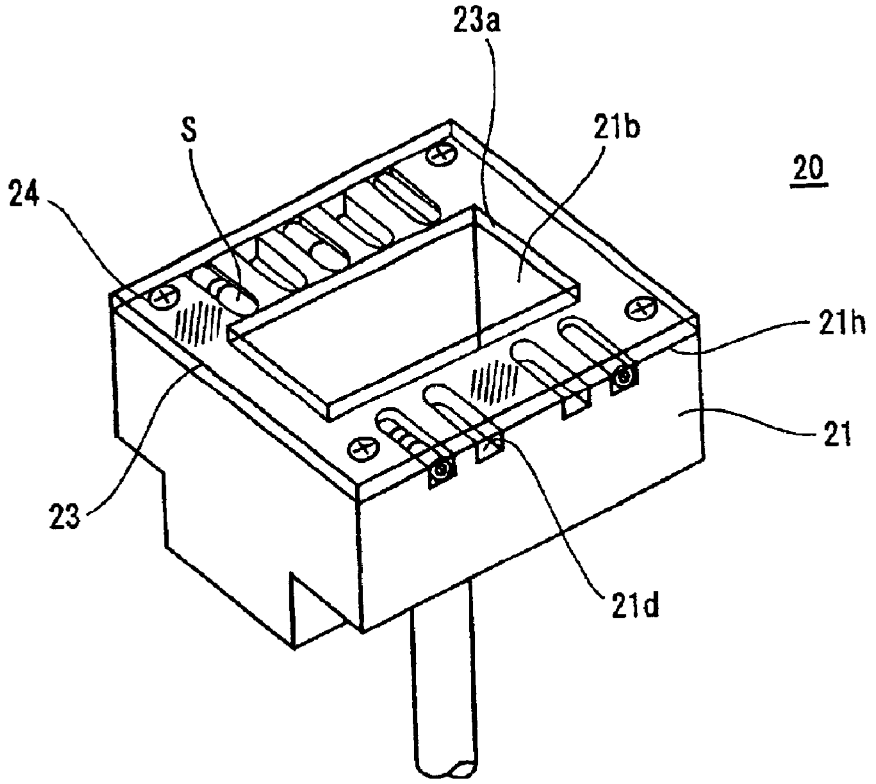
FIG. 5 is a perspective view of the frame jig for a connector according to the second embodiment.

FIG. 4 and FIG. 5 depict a frame jig 20 for a connector according to a second embodiment of the present invention, in which a number of electric wire grooves 21*d* are provided in parallel at the peripheral rim 21*c* of the recess 21*b* which is provided on the upper face 21*a* of the holder 21. Each of the respective electric wire grooves 21*d* extends from the vicinity of the recess 21*b* to the end edge 21*h* of the holder 21, the width of the grooves is dimensioned to receive the sample electric wires S accommodated within the grooves, and the depth of the grooves is made slightly shallower than the outer diameter dimension of the sample electric wires S. The electric wire grooves 21*d* are provided at every position which confronts with a respective cavity of the connector retained at the recess 21*b*, and as a result, the respective electric wire grooves 21*d* are positioned in parallel and at the same pitch as the respective cavities. Further, screw holes 21*k* are provided at the four corners of the upper face 21*a* of the holder 21.

Additionally, a transparent panel 23 for fixing the sample electric wires is configured to be fixed by screws on the upper face 21*a* of the holder 21. At the center, the transparent panel 23 is provided with a rectangular connector transferring hole 23*a,* and the panel approximates the shape of the peripheral rim 21*c* of the upper face 21*a* of the holder 21, and the panel is provided with the screw receiving holes 23*b* at the four corners thereof.

Each of the sample electric wires S installed on the holder 21 is cut to have length shorter than the electric wire grooves 21*d.* These sample electric wires S, which are the same kind of electric wires that are inserted in the respective cavities of the connector retained within the recess 21*b,* are positioned in the electric wire grooves 21*d,* and the electric wire grooves 21*d* are located at positions that confront the cavities where the same kind of electric wires as the sample electric wires S are inserted. The sample electric wires S protrude slightly from the electric wire grooves 21*d,* due to the relationship of the groove depth and the outer diameter dimension of the wires.

After all of the sample electric wires S are positioned in the corresponding grooves 21*d,* the transparent panel 23 is mounted on the upper face 21*a* of the holder 21, and the four corners are fixed by being fastened with the screws 24. At this time, since the sample electric wires S protrude from the electric wire grooves 21*d,* the lower face 23*c* of the transparent panel 23 is pressed against the electric wires S and the electric wires S are fixed by being sandwiched between the transparent panel and the bottom face of the electric wire grooves 21*d.* Since the sample electric wires S can be visually confirmed through the transparent board 23, the connector of the concave part 21*b* is installed in a manner similar to the first embodiment. Thus, the same kinds of electric wires as the sample electric wires S are inserted in the cavities which confront the installation position of the sample electric wires S.

Further, since the sample electric wires S are covered with the transparent panel 23, problems such as dropping-out caused by being hung during insertion or the like does not occur. Further, when the kinds of the inserted electric wires and the insertion kind are to be changed, the transparent panel 23 is removed by reversing the above-mentioned procedure, and the corresponding kinds of sample electric wires S are again positioned in the corresponding electric wire grooves 21*d.* In the frame jig 20 for a connector according to the second embodiment of the invention, when the connector being the installation object is a type having a single stage of cavities, the electric wire grooves are provided on only one side of the recess of the holder, and it is sufficient to install the sample electric wires on one side.

Figure 6:
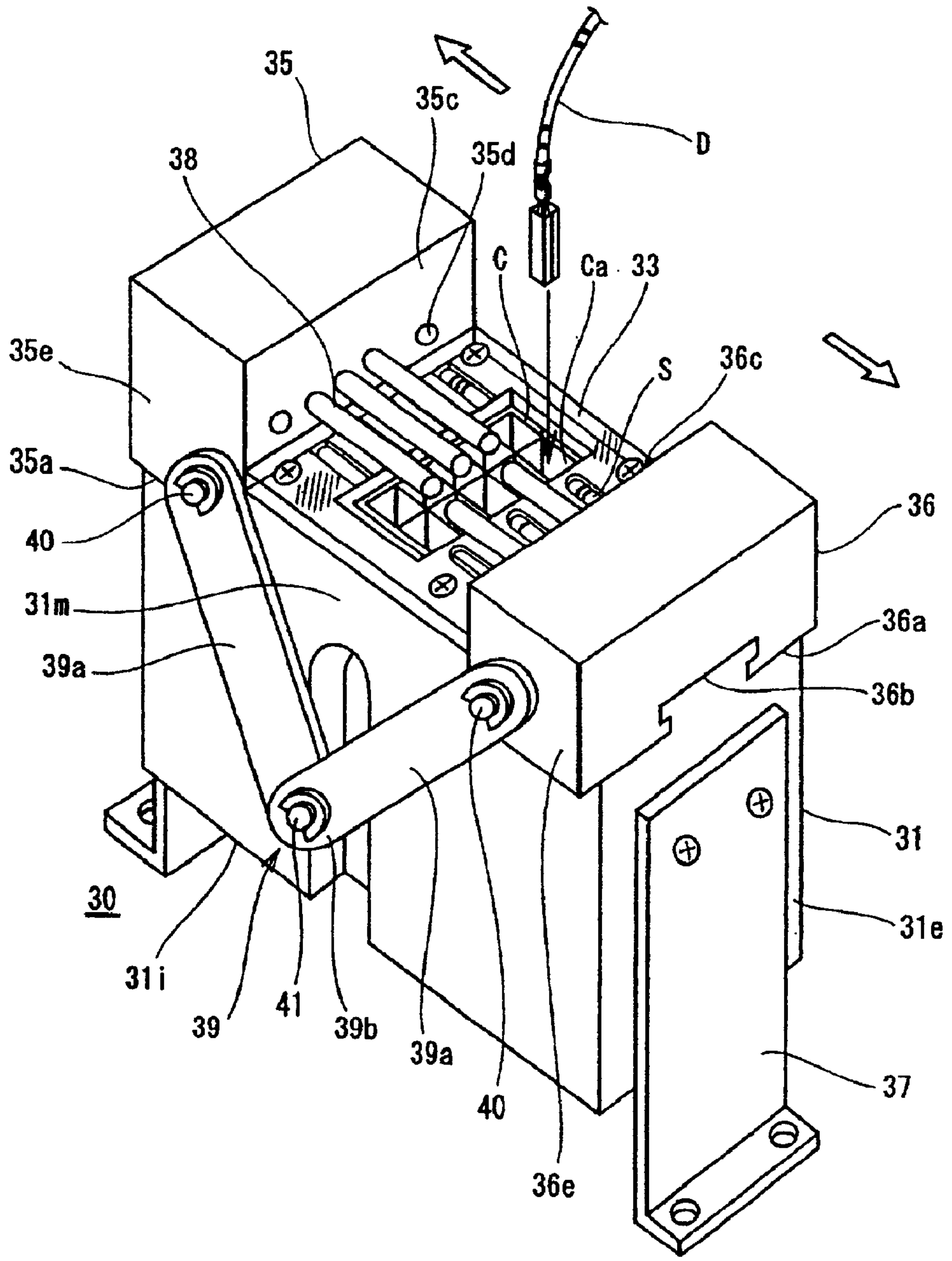
FIG. 6 is a perspective view of the frame jig for a connector according to a third embodiment of the present invention.

FIG. 6 depicts a frame jig 30 for a connector according to a third embodiment of the present invention, in which a first moving member 35 and a second moving member 36 are respectively mounted on the holder 31. L-shaped supporting brackets 37 are used for mounting the frame jig 30 to the wiring board and are respectively installed on the side faces 31*e* at both ends of the longer sides 31*i* of the holder 31.

Figure 7:
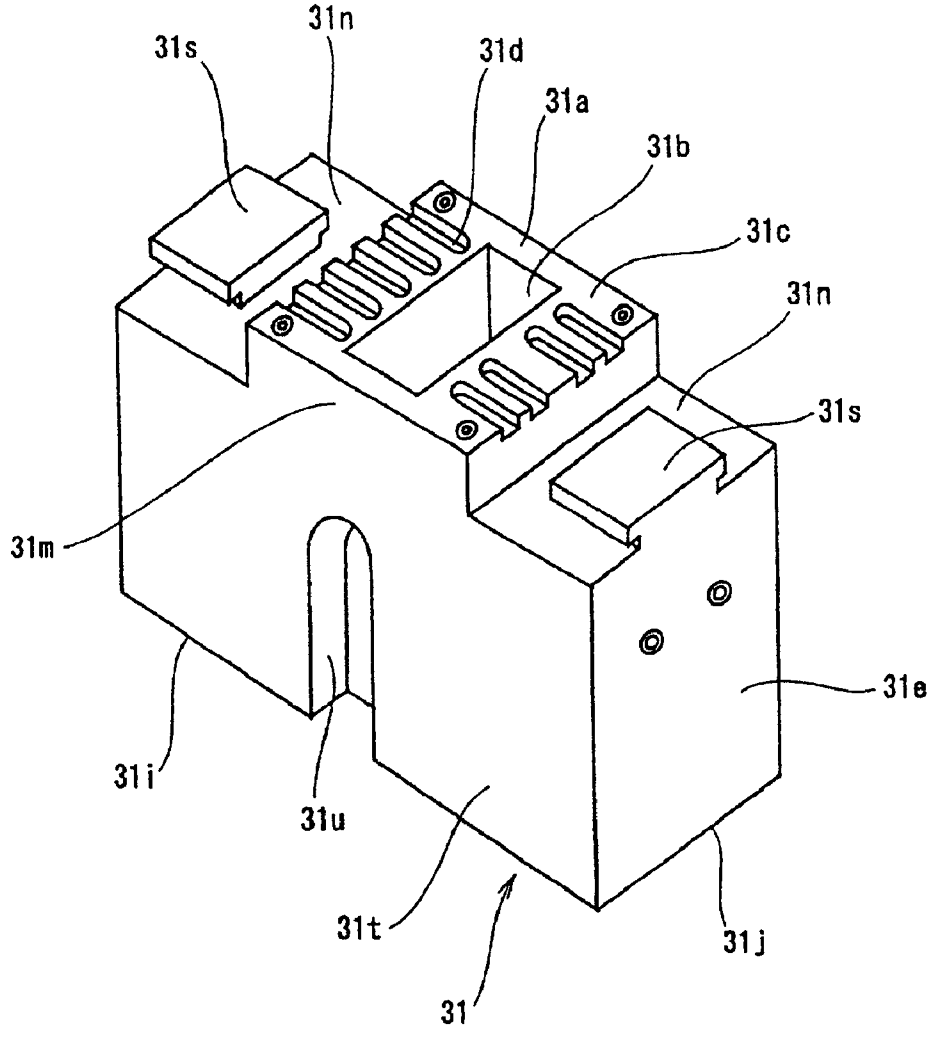
FIG. 7 is a perspective view of the holder according to the third embodiment.

As shown in FIG. 7, the holder 31 is provided with a projecting portion 31*m* which projects upwardly at a central position, and the projecting portion 31*m* has about the same configuration as the frame jig 20 for a connector according to the second embodiment. Namely, a recess 31*b* for retaining the connector is provided at the central part of the uppermost face 31*a,* and the electric wire grooves 31*d* are provided on the peripheral rim 31*c* of the recess 31*b,* in a manner similar to the second embodiment. Further, screw holes for fixing a transparent panel 33 in a manner similar to the transparent panel 22 of the second embodiment are provided at the four corners of the uppermost face 31*a.*

Additionally, rails 31*s* that regulate the movement of first and second moving members 35,36 are provided to project from the upper faces 31*n* on opposite sides of the projecting portion 31*m* of the holder 31. The upper part of the rails 31*s* is wider than the portion that protrudes from the upper faces 31*n,* and separation of the first and the second moving members 35,36 in the upward direction is prevented. Further, the holder 31 is provided with pin grooves 31*u* which extend from the lower surface of the holder 31 toward the projecting portion 31*m,* at the center of the side faces 31*t* on both sides of the long side 31*i,* respectively.

On the other hand, the first moving member 35 and second moving member 36 have a block shape, and are provided at the center of the bottom faces 35*a*,36*a* with rail grooves 35*b*,36*b* having a sectional shape corresponding with the sectional shape of the rails 31*s* of the holder 31. Further, a number of bar holes 35*b*,36*b* are provided in one face 35*c* and one face 36*c* at the projecting portion 31*m* side of the holder 31. These bar holes 35*d*,36*d* are provided at the same pitch corresponding to the respective cavities Ca of a connector C which is retained on the recess 31*b* of the projecting portion 31*m,* at a position above the transparent panel 33 when the transparent panel 33 is fixed to the projecting portion 31*m.*

Masking bars 38 are installed in the bar holes 35*d*,36*d*, and protrude from the first and the second moving members 35,36. The masking bars 38 have an outer diameter sufficiently large to block the respective cavities Ca of the connector C, and the protruding length is set to a dimension in which the ends of the bars extend almost to the center of the projecting portion 31*m* (as shown in FIG. 8A), at a position in which one face 35*c* and one face 36*c* of the first and the second moving members 35,36 contact the ends of the projecting portion 31*m.*

Further, elongated bar-shaped link members 39*a* are mounted on the left and right side faces 35*e*,36*e* by pivot pins 40, in a condition in which they can freely pivot. The first and the second moving members 35,36, having the link members 39*a* thus installed, are installed on the holder 31 along the rails 31*s* in a condition in which they can freely slide by fitting the rail grooves 36*b*,36*b* with the rails 31*s* of the holder 31. After installing thus, the ends 39*b* of the respective link members 39*a* are overlapped, and link pins 41 are installed at the ends 39*b*. Protruding ends 41*a* (note FIG. 8A) of the link pins 41 are housed in the pin grooves 31*u* of the holder 31, and links 39 are formed by the link members 39*a*, the pivot pins 40 and the link pins 41.

Figure 8:
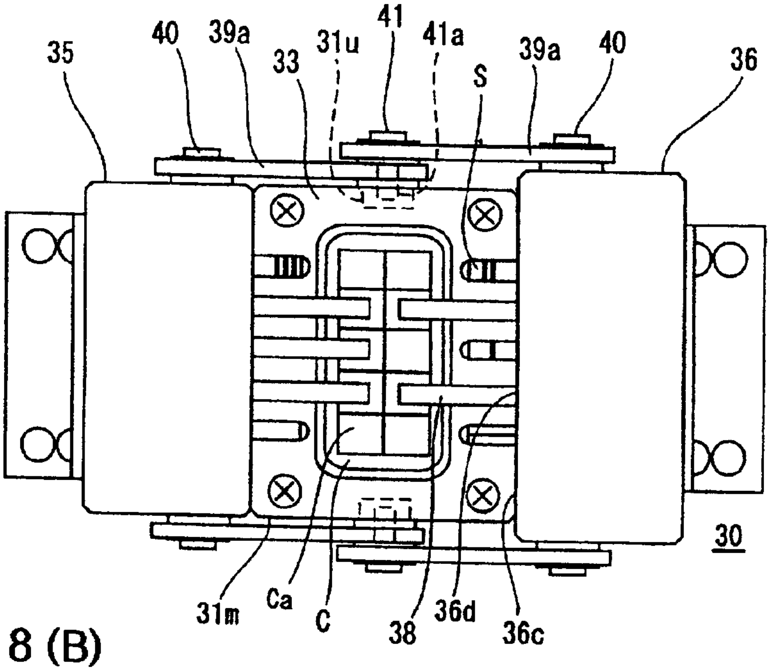
FIGS. 8(A) and 8(B) are a plan view and a front view, respectively, of an approaching position of the moving member.
Figure 8:
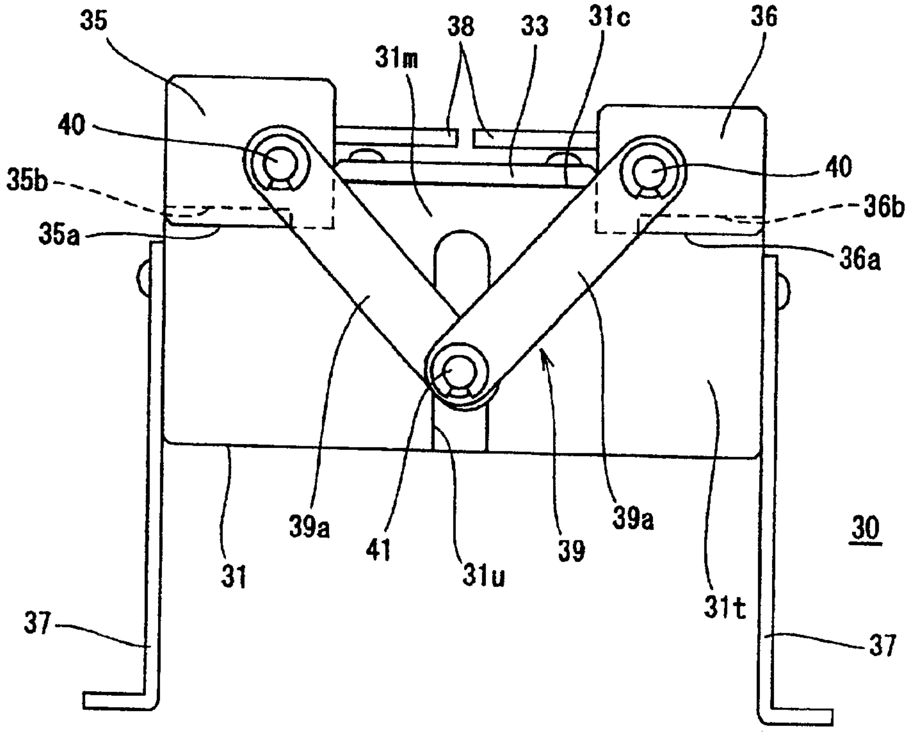
Figure 9:
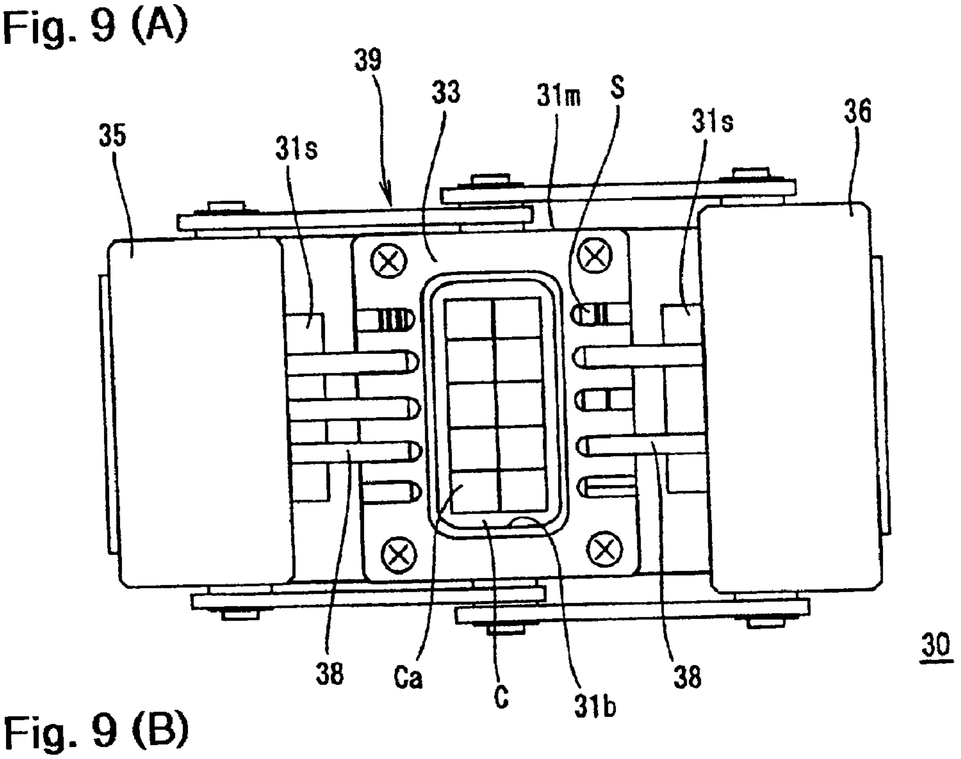
FIGS. 9(A) and 9(B) are a plan view and a front view, respectively, of returning position of the moving member.
Figure 9:
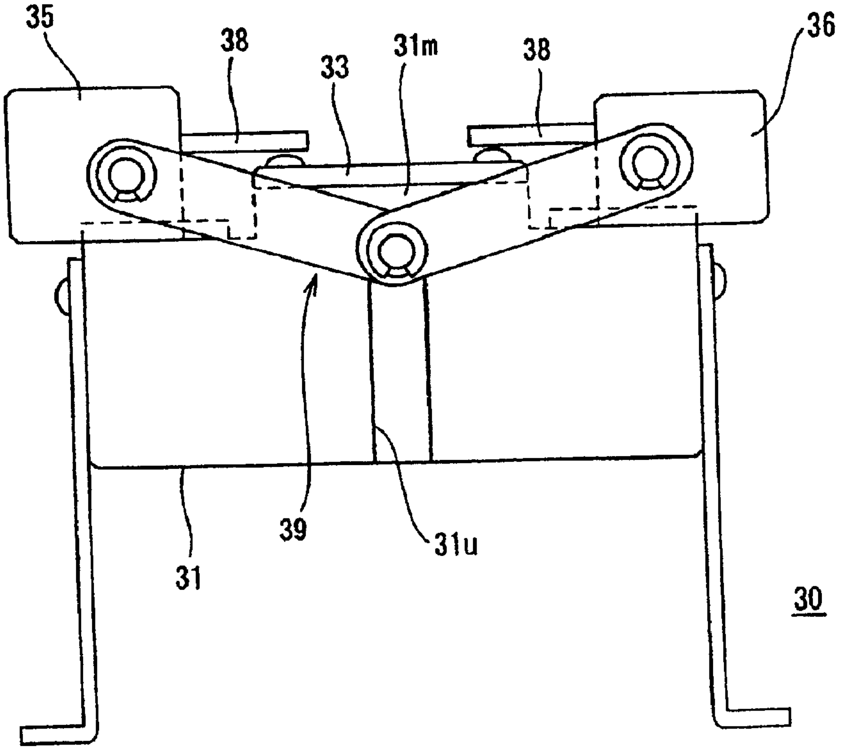
Figure 10:
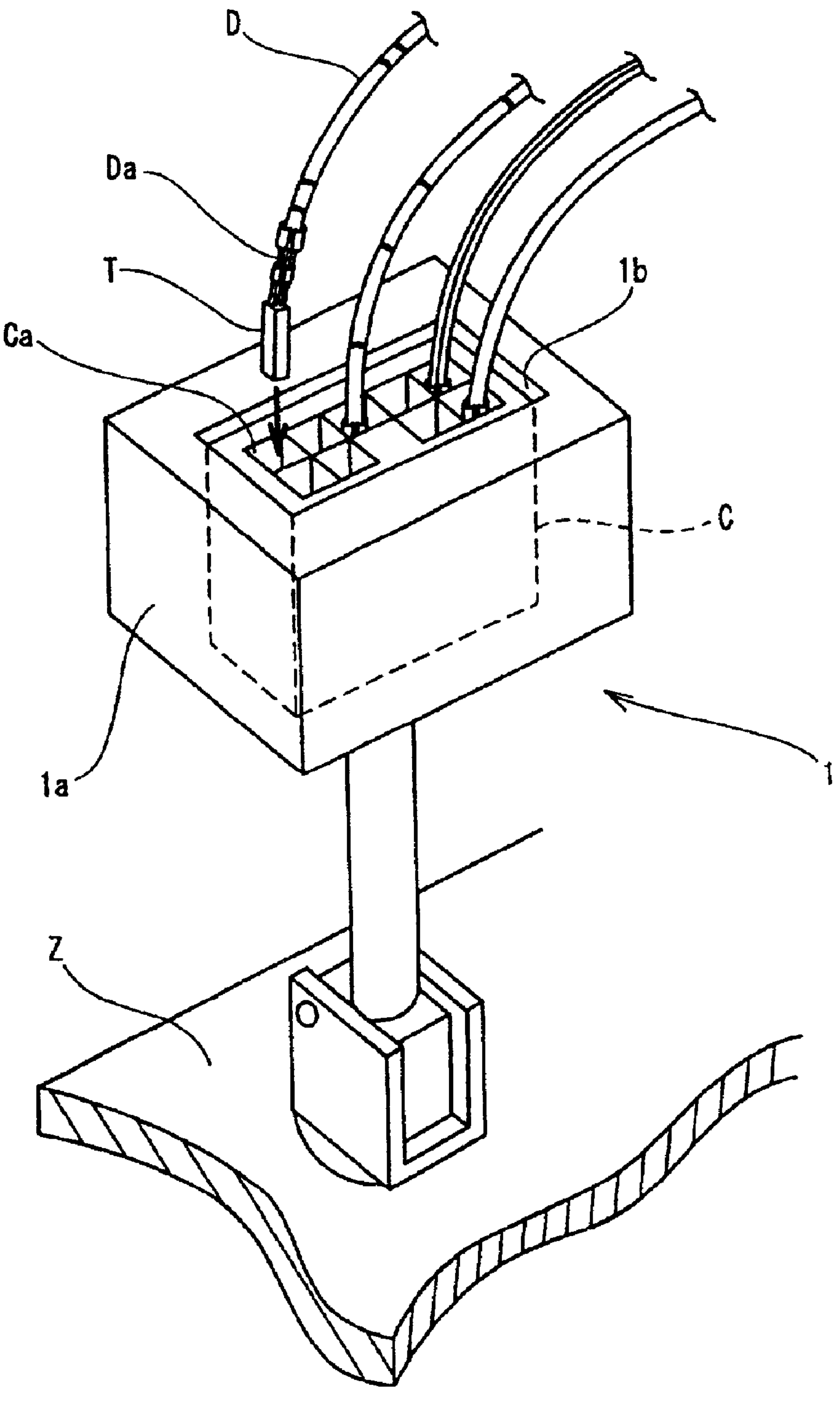
Fig.10 Prior Art
FIG. 10 is a perspective view of a conventional frame jig for a connector.

The first and second moving members 35,36 are thus configured to be linked and moved by the thus formed links 39, and can be moved within a range from an approaching position relative to the peripheral rim 31*c* of the projecting portion 31 shown in FIGS. 8(A), 8(B), to a distal position shown in FIGS. 9(A), 9(B). The range of movement of the first and second moving members 35,36 permits the ends of the masking bars 38 to retreat from a position above and covering the recess 31*b* to the distal position so that the masking bars do not block the upper opening of the recess 31*b*.

The insertion work of electric wires by the frame jig 30 for a connector will now be described.

First, as a stage of preparing the work in a manner similar to the second embodiment, sample electric wires S, which correspond with the cavities Ca of the connector C which is the objective of the work, are mounted in the electric wire grooves 31*d* of the projecting portion 31*m,* and are fixed therein by the transparent panel 33. Then, the masking bars

38 are respectively installed in the bar holes 35*d*,36*d* at the ends of the first and the second moving members 35,36 at locations corresponding to the cavities Ca of the connector C which require no insertion of electric wires, and the preparation of the work is completed.

After completion of the preparation work, the first and the second moving members 35,36 are positioned in the distal position shown in FIGS. 9(A), 9(B). In the approaching position, since the cavities Ca requiring no insertion of wires are blocked by the masking bars 38 as shown in FIG. 8(A), insertion of electric wires becomes physically impossible, and the electric wires cannot by mistakenly inserted in the blocked positions of the cavities.

Further, since the sample electric wires S that are not blocked by the respective masking bars 38 can be confirmed in this condition, the kinds of the electric wires D to be inserted can be easily determined in the same manner as in the first and second embodiments. Accordingly, since the insertion work may be easily carried out by marking the cavities Ca other than the locations which are blocked by the masking bars 38, the insertion work can be carried out by concentrating on only the open cavities Ca, and the work efficiency is improved. Further, when the connector is to be removed after completion of the insertion work, the first and the second moving members 35,36 are returned to the distal position and the connector is removed without interference with the masking bars 38.

Further, it is not required that the frame jig 30 for a connector always be provided with a pair of the moving members. For example, if the connector being the installation objective is a type having one stage of cavities, only one of the moving members is installed, the cavities not requiring insertion are blocked by the masking bars, and the kinds and positions of the inserted electric wires may be easily determined by the sample electric wires.

As is clear from the above description, when the frame jig for a connector of the present invention is used, the kinds of electric wires and the installation positions can be confirmed by the sample electric wires installed without looking to the arrangement drawing. Thus, the confirmation is easy, the burden required for confirmation by a worker can be reduced together with reduction of installation mistakes of the electric wires, and the installation work becomes more efficient. Further, the reduction of installation mistakes of electric wires reduces the trouble, time and the like required for correction of the mistakes, the amount of deformation of terminals during modification and damage to the connector is reduced, and the expenses corresponding to these defective products can be reduced.

Further, since sample electric wires installed on a holder can be easily installed and removed, a jobsite can flexibly respond to the occurrence of design change and the like. Further, since the sample electric wires can be confirmed at a glance, a worker can precisely grasp the working instruction, and can perform work with fewer mistakes.

Moreover, when the electric wire grooves are provided on the upper face of the holder and the sample electric wires are fixed in the electric wire grooves by the transparent panel, problems such as dropping-out caused by the hanging of the sample electric wires during the installation work and the like do not occur. Further, easy exchangeability of the sample electric wires is also provided, and usability can be further improved. Moreover, when the moving members having the protruding masking bars are installed on the holder, the kinds of electric wires to be inserted and the inserted locations designated by the sample electric wires are ensured, the insertion of electric wires to the cavities not requiring insertion is further made impossible by the masking bars, confirmation error of the positions of the inserted cavities can be positively prevented, and the rate of occurrence of problems at the start of production of a new machine and at the start of a new worker can be remarkably reduced.

Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application Nos. JP 2000-164009, filed on Jun. 1, 2000, and JP 2001-40136, filed Feb. 16, 2001, which are herein expressly incorporated by reference in their entirety.

What is claimed is:

1. A frame jig for a connector to be mounted on terminal ends of electric wires, said frame jig comprising:

a holder having a recess in an upper face thereof, said recess having a peripheral rim and configured to receive the connector;

sample electric wire retainers on said holder configured to hold sample electric wires of the same type as the electric wires to be inserted in respective cavities of the connector at locations on said holder adjacent respective cavities of the connector retained by the peripheral rim of said holder recess; and said sample electric wire retainers further comprising:

apertures provided in said holder at each location adjacent respective cavities on the connector at said peripheral rim;

side recesses provided on side faces of said holder on the sides where said apertures are provided, the sample electric wires having one end insertable into a respective one of said apertures and the other ends of the sample electric wires are positionable within said side recesses; and a locking member insertable into said side recesses so that the sample electric wires are detachably installed therein.

2. The frame jig for a connector as set forth in claim 1, wherein said side recesses are provided at a distance from an upper end of said holder side faces, and parallel grooves are provided in the side faces of said holder to communicate with said side recesses respectively to correspond with each location facing said apertures, from the upper end of said holder side faces to said side recesses, and the sample electric wires are positionable in parallel in said grooves.

3. The frame jig according to claims 2, further comprising at least one sample electric wire, said sample electric wire having one end inserted into a respective one of said apertures, said sample electric wire positioned in a respective one of said grooves, and the other end of said sample electric wire positioned within one of said side recesses and retained in position by said locking member.

4. The frame jig according to claims 1, further comprising at least one sample electric wire, said sample electric wire having one end inserted into a respective one of said apertures, and the other end positioned within one of said side recesses and retained in position by said locking member.

5. A frame jig for a connector to be mounted on terminal ends of electric wires, said frame jig comprising:

a holder having a recess in an upper face thereof, said recess having a peripheral rim and configured to receive the connector;

sample electric wire retainers on said holder configured to hold sample electric wires of the same type as the electric wires to be inserted in respective cavities of the connector at locations on said holder adjacent respective cavities of the connector retained by the peripheral rim of said holder recess;

movable members mounted on said holder for movement toward and away from said peripheral rim on which the sample electric wires are positionable;

at least one masking bar provided on at least one of said movable members, said at least one masking bar having a length that permits covering of an upper opening of a respective connector cavity in a first position of said movable members and uncovering of the upper opening in a second position of said movable members; and wherein the upper part of respective cavities, into which the electric wires of the connector retainable in said recess are not required to be inserted, are blocked in said first position of said movable members.

6. The frame jig according to claim 5, wherein said masking bars project from a side face of at least one of said movable members.

7. The frame jig according to claim 6, wherein said masking bars project from a side face of both of said movable members in a direction toward each other.

8. The frame jig according to claim 5, further comprising a link mechanism interconnecting said holder and said movable members so that movement of one of said movable members causes movement of the other of said movable members.

9. A frame jig for a connector having a plurality of connector cavities to receive terminal ends of electric wires, said frame jig comprising:

a holder having a recess in an upper face thereof, said recess having a peripheral rim and configured to receive the connector;

movable members mounted on said holder for movement toward and away from said peripheral rim;

at least one masking bar provided on at least one of said movable members, said at least one masking bar having a length that permits covering of an upper opening of a respective connector cavity in a first position of said movable members and uncovering of the upper opening in a second position of said movable members; and wherein the upper part of respective cavities, into which the electric wires of the connector retainable in said recess are not required to be inserted, are blocked in said first position of said movable members.

10. The frame jig according to claim 9, wherein said masking bars project from a side face of at least one of said movable members.

11. The frame jig according to claim 10, wherein said masking bars project from a side face of both of said movable members in a direction toward each other.

12. The frame jig according to claim 9, further comprising a link mechanism interconnecting said holder and said movable members so that movement of one of said movable members causes movement of the other of said movable members.

13. A frame jig for a connector to be mounted on terminal ends of electric wires, said frame jig comprising:

a holder having a recess in an upper face thereof, said recess having a peripheral rim and configured to receive the connector;

sample electric wire retainers on said holder configured to hold sample electric wires of the same type as the electric wires to be inserted in respective cavities of the connector at locations on said holder adjacent respective cavities of the connector retained by the peripheral rim of said holder recess; and wherein parallel electric wire grooves are provided in alignment with every location facing respective cavities of the connector at said peripheral rim, the sample electric wires are mountable in said electric wire grooves, and a transparent board is configured to be mounted and fixed on said peripheral rim on which said electric wire grooves are provided to retain the sample electric wires.

14. The frame jig according to claims 13, further comprising at least one sample electric wire, said sample electric wire being mounted in a respective one of said electric wire grooves and retained in position by said transparent board.

* * * * *